United States Patent
Mcpherson et al.

(10) Patent No.: US 11,036,560 B1
(45) Date of Patent: Jun. 15, 2021

(54) DETERMINING ISOLATION TYPES FOR EXECUTING CODE PORTIONS

(71) Applicant: Amazon Technologies, Inc., Seattle, WA (US)

(72) Inventors: George Steven Mcpherson, Seattle, WA (US); Mehul A. Shah, Saratoga, CA (US); Prajakta Datta Damle, San Jose, CA (US); Gopinath Duddi, San Jose, CA (US); Anurag Windlass Gupta, Atherton, CA (US); Sandhya Edupuganti, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 493 days.

(21) Appl. No.: 15/385,781

(22) Filed: Dec. 20, 2016

(51) Int. Cl.
  *G06F 9/46* (2006.01)
  *G06F 9/50* (2006.01)
  *G06F 16/25* (2019.01)

(52) U.S. Cl.
  CPC .......... *G06F 9/5077* (2013.01); *G06F 16/254* (2019.01)

(58) Field of Classification Search
  CPC ........................................... G06F 9/52
  USPC ........................................ 718/104
  See application file for complete search history.

(56) References Cited

U.S. PATENT DOCUMENTS

| | | | | |
|---|---|---|---|---|
| 6,125,447 A * | 9/2000 | Gong | ....................... | G06F 9/468 713/154 |
| 6,192,476 B1 * | 2/2001 | Gong | .................... | G06F 21/629 709/229 |
| 6,349,297 B1 | 2/2002 | Shaw et al. | | |
| 8,024,369 B2 | 9/2011 | Pellegrini et al. | | |
| 8,037,050 B2 | 10/2011 | Oliver et al. | | |
| 8,136,158 B1 * | 3/2012 | Sehr | ........................ | G06F 21/51 726/22 |
| 8,751,438 B2 | 6/2014 | Kharod et al. | | |
| 8,752,047 B2 * | 6/2014 | Banga | ................. | G06F 9/45533 718/1 |
| 8,788,846 B2 * | 7/2014 | Park | ..................... | G06F 21/6209 713/190 |
| 8,850,573 B1 * | 9/2014 | Chen | ................... | G06F 12/1491 726/22 |
| 9,471,775 B1 * | 10/2016 | Wagner | .................... | H04L 63/20 |
| 9,684,785 B2 * | 6/2017 | Walsh | ...................... | G06F 21/53 |
| 9,858,258 B1 | 1/2018 | Pasquini | | |
| 10,545,979 B2 | 1/2020 | McPherson et al. | | |

(Continued)

OTHER PUBLICATIONS

International Search Report and Written Opinion from PCT/US2017/063259, dated Jan. 25, 2018, Amazon Technologies, Inc., pp. 1-19.

(Continued)

*Primary Examiner* — Mehran Kamran
(74) *Attorney, Agent, or Firm* — Robert C. Kowert; Kowert, Hood, Munyon, Rankin & Goetzel, P.C.

(57) ABSTRACT

Isolation types may be determined for resources that execute portions of code. Code may be received via a network-based interface from a client for execution. An execution plan for the code may be generated and evaluated to determine one or more isolation types for computing resources that execute the code. The computing resources that are configured to provide the determined isolation types may then be identified and execution of the code initiated at the identified computing resources.

20 Claims, 7 Drawing Sheets

(56) References Cited

U.S. PATENT DOCUMENTS

| | | | |
|---|---|---|---|
| 2002/0174224 A1* | 11/2002 | Scheifler | H04L 29/06 709/225 |
| 2003/0196193 A1* | 10/2003 | Kuzmin | G06F 11/3419 717/130 |
| 2005/0283622 A1* | 12/2005 | Hall | G06F 21/51 713/190 |
| 2006/0005019 A1* | 1/2006 | Chao | G06F 21/52 713/166 |
| 2007/0203719 A1* | 8/2007 | Kenagy | G06Q 40/025 705/39 |
| 2007/0266426 A1* | 11/2007 | Iyengar | H04L 9/3213 726/5 |
| 2008/0052534 A1* | 2/2008 | Harada | G06F 21/85 713/190 |
| 2008/0104014 A1* | 5/2008 | Burger | G06F 16/24542 |
| 2009/0177671 A1 | 7/2009 | Pellegrini et al. | |
| 2009/0192979 A1 | 7/2009 | Lunde | |
| 2009/0240663 A1 | 9/2009 | Plattner et al. | |
| 2010/0030750 A1 | 2/2010 | Oliver | |
| 2010/0058291 A1* | 3/2010 | Hahn | G06F 11/302 717/113 |
| 2010/0086610 A1 | 4/2010 | Rome et al. | |
| 2010/0274750 A1 | 10/2010 | Oltean et al. | |
| 2010/0290677 A1 | 11/2010 | Kwan | |
| 2011/0023028 A1* | 1/2011 | Nandagopal | G06F 11/2038 718/1 |
| 2011/0071817 A1 | 3/2011 | Siivola | |
| 2011/0107338 A1* | 5/2011 | Ylonen | G06F 9/467 718/102 |
| 2011/0107383 A1 | 5/2011 | Barton et al. | |
| 2011/0154431 A1* | 6/2011 | Walsh | G06F 21/53 726/1 |
| 2012/0042162 A1* | 2/2012 | Anglin | G06F 21/6218 713/165 |
| 2012/0054744 A1* | 3/2012 | Singh | G06F 9/45558 718/1 |
| 2012/0203877 A1* | 8/2012 | Bartholomay | H04L 41/0813 709/221 |
| 2013/0055256 A1* | 2/2013 | Banga | G06F 9/5077 718/1 |
| 2013/0061133 A1 | 3/2013 | Naveh | |
| 2013/0160133 A1* | 6/2013 | Avgerinos | G06F 21/57 726/26 |
| 2013/0167222 A1* | 6/2013 | Lewis | G06F 21/53 726/17 |
| 2013/0239089 A1* | 9/2013 | Eksten | G06F 8/20 717/120 |
| 2013/0275360 A1 | 10/2013 | Kharod et al. | |
| 2013/0290928 A1* | 10/2013 | Johnson | G06F 8/40 717/109 |
| 2014/0047556 A1* | 2/2014 | Davis | G06F 21/606 726/28 |
| 2014/0283031 A1* | 9/2014 | Eksten | G06F 21/51 726/22 |
| 2014/0304600 A1 | 10/2014 | Chu | |
| 2015/0095290 A1 | 4/2015 | Saliba | |
| 2015/0100542 A1 | 4/2015 | Li et al. | |
| 2015/0113009 A1 | 4/2015 | Zhou et al. | |
| 2015/0229645 A1* | 8/2015 | Keith | G06F 21/53 726/4 |
| 2015/0286701 A1 | 10/2015 | Wideman | |
| 2015/0347541 A1 | 12/2015 | Holmes et al. | |
| 2015/0356293 A1* | 12/2015 | Biswas | G06F 21/31 726/22 |
| 2016/0110340 A1 | 4/2016 | Bojja et al. | |
| 2016/0180084 A1* | 6/2016 | Spurlock | G06F 21/57 726/23 |
| 2016/0224360 A1* | 8/2016 | Wagner | G06F 9/45558 |
| 2016/0224785 A1* | 8/2016 | Wagner | G06F 9/45533 |
| 2016/0259628 A1* | 9/2016 | Schuchman | G06F 8/30 |
| 2016/0352707 A1 | 12/2016 | Belyy | |
| 2016/0360009 A1* | 12/2016 | Borley | H04L 67/16 |
| 2017/0068595 A1 | 3/2017 | Nautiyal et al. | |
| 2017/0104627 A1 | 4/2017 | Bender et al. | |
| 2017/0126795 A1* | 5/2017 | Kumar | H04L 67/1023 |
| 2017/0185661 A1 | 6/2017 | Belyy et al. | |
| 2017/0213037 A1* | 7/2017 | Toledano | H04L 63/06 |
| 2017/0318026 A1* | 11/2017 | Lu | G06F 21/51 |
| 2018/0082057 A1* | 3/2018 | LeMay | G06F 21/53 |
| 2018/0129497 A1* | 5/2018 | Biddle | G06F 8/71 |
| 2018/0157703 A1* | 6/2018 | Wang | G06F 16/2453 |
| 2018/0157825 A1* | 6/2018 | Eksten | H04L 9/3239 |
| 2018/0157842 A1* | 6/2018 | Holz | G06F 21/577 |
| 2018/0189350 A1* | 7/2018 | Imaki | G06F 16/24568 |
| 2018/0189510 A1* | 7/2018 | Seko | H04N 21/485 |
| 2018/0276781 A1* | 9/2018 | Oliveria | G06T 1/0028 |

OTHER PUBLICATIONS

Bratko, A. et al., "Exploiting Structural Information for semi-structured document categorization", Information Processing & Management, dated May 1, 2006, vol. 42, No. 3, pp. 679-694.

Juan Trujillo et al., "A UML Based Approach for Modeling ETL Processes in data warehouses", In: Network and parallel computing, dated Oct. 16, 2003, pp. 1-14.

Anonymous, "Start informatica job when a row is updated", retrieved from URL: https://network.informatica.com/thread/13920. on Jan. 10, 2018. pp. 1-5.

Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.

Oracle: "Triggers-Oracle Database Concepts", Retrieved from URL: https://Web.archive.org/web/20150918220843/https://docs.oracle.com/cd/B19306_01/server.102/b14220/triggers.htm, retrieved on Jan. 11, 2018, pp. 1-17.

U.S. Appl. No. 15/385,764, filed Dec. 20, 2016, Mehul A. Shah.
U.S. Appl. No. 16/846,141, filed Apr. 10, 2020, Mehul A. Shah.
U.S. Appl. No. 15/385,787, filed Dec. 20, 2016, George Steven Mcpherson.
U.S. Appl. No. 16/752,022, filed Jan. 24, 2020, George Steven McPherson.
U.S. Appl. No. 15/385,777, filed Dec. 20, 2016, Mehul A. Shah.
U.S. Appl. No. 15/385,784, filed Dec. 20, 2016, George Steven McPherson.

* cited by examiner

DETERMINING ISOLATION TYPES FOR EXECUTING CODE PORTIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing the resources have become increasingly complicated. A distributed system referred to as a provider network may offer, to various customers, access to computing resources and services implemented using the distributed system. When customers access such resources remotely, the resources may be said to reside "in the cloud" and may represent cloud computing resources. For example, using such resources, the provider network may execute programs on behalf of customers. Thus techniques for leveraging the power of distributed systems to perform operations on behalf users without burdening the users with provisioning, administrating, and managing tasks can be implemented. However, it may be desirable to ensure that executing requested tasks does not result in performing malicious, unsafe, or erroneous operations, which may affect other clients in addition to the requesting client.

Figure 1:
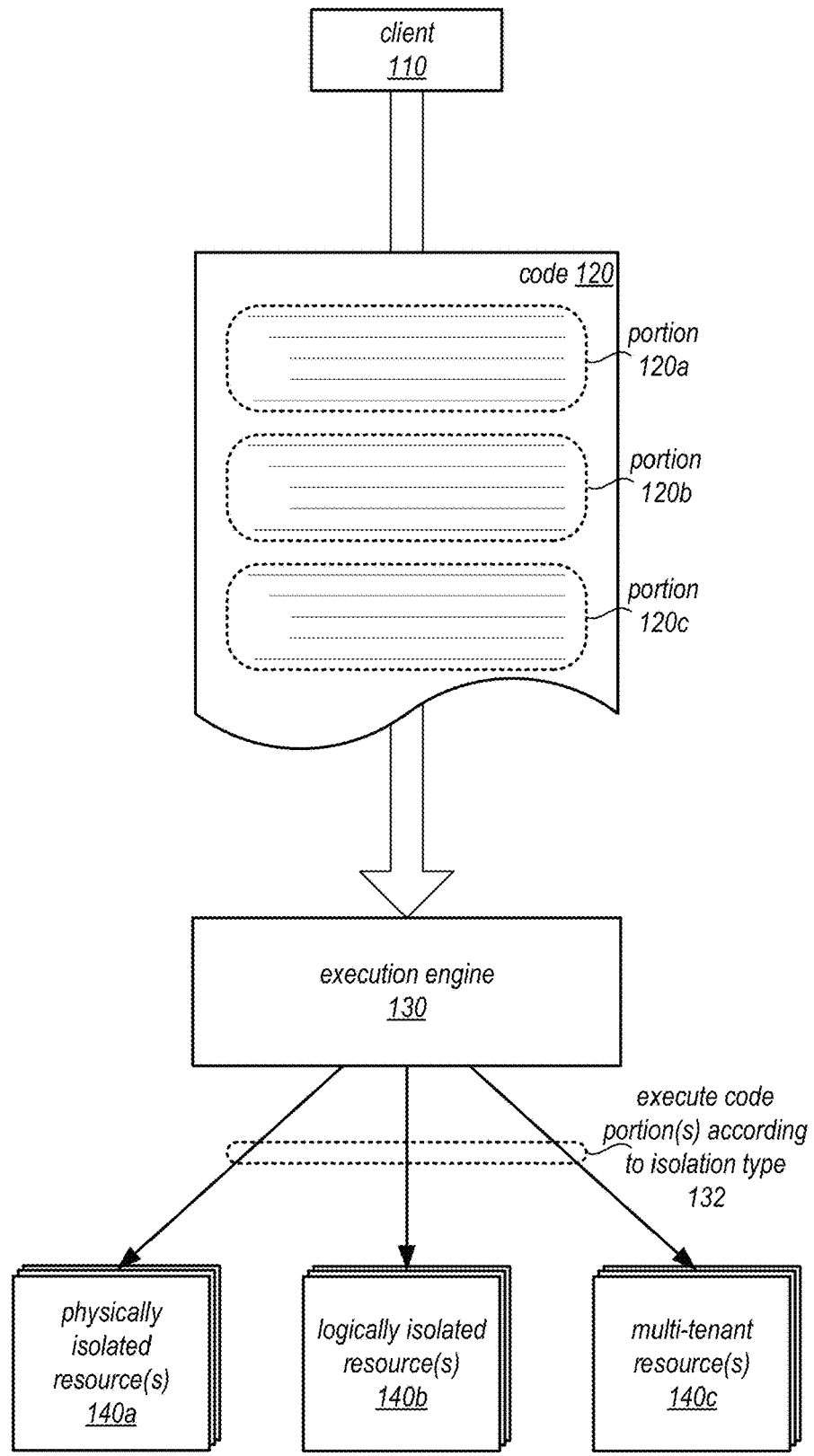
FIG. 1 illustrates a logical block diagram of determining isolation types for executing code portions, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of determining isolation types for executing code portions are described herein. Typically, computing services operate under a client-service paradigm that offers users a pre-defined set of operations or functionality in exchange for a managed experience, performing the pre-defined operations with little or no further input other than the initial invocation of the service. While this paradigm has allowed for powerful advances in performing certain tasks, the constrained opportunity to flexibly define the operations performed by computing services may force users to wait upon the development of a service that performs the tasks or operations needed by the user. In some circumstances, pre-defined operations or functionality may be in appropriate due to the number of unique or uncommon tasks or operations that may need to be performed. For example, when performing Extract, Transform, Load (ETL) processing, customized or highly-specified operations may be performed to extract data of a certain data format or data schema, transform the data into another data format or schema, and load the data into a desired location. Services that offer pre-defined operations or functionality to perform the exact transformations desired in the various combinations of ETL jobs that may be performed may be unlikely to be developed.

For scenarios like ETL processing, customized execution may be offer greater opportunities to perform the different types of operations or tasks desired. Therefore, execution platforms that allow for customized operations as may be defined by code provide users with the opportunity to leverage a distributed processing environment while implementing custom operations or tasks. However, the development and management burdens imposed by utilizing services that provide execution platforms without the other benefits of cloud or network-based service computing may offer little improvement to users overall experience executing custom tasks or operations.

A code execution platform may be implemented that manages the execution of code at computing resources instead of burdening users with the task of identifying, configuring, procuring, and managing resources to execute the code. However, when accept code from external sources, safety concerns may arise. Submitted code may be intentionally malicious (e.g., attempting to access data or modify the operation of computing resources in impermissible ways), accidentally destructive of data or resources, or disruptive, consuming resources that starves other operations from being performed. In order to provide burden free code execution, techniques to ensure the safety of computing resources may be implemented. Isolation is one type of technique for ensuring the safety of computing resources. By implementing different types of isolation, the impact that malicious, destructive, or disruptive code may have can be contained. Moreover, determining isolation types for executing code portions may be performed automatically so that a user is not burdened with creating code within certain execution boundaries or safety limits, as isolation types may be implemented to limit the threat that executing external code can pose.

FIG. 1 illustrates a logical block diagram of determining isolation types for executing code portions, according to some embodiments. A client 110 may submit code 120 to an execution engine 130 for execution. Code 120 may include various different portions 120a, 120b, 120c which declare or specify different operations to perform. Some operations may be known operations, with implementing code provided by execution engine 130, whereas other portions may be custom or unknown, implemented according to instructions in code 120 (or other libraries or sources external to execution engine 130). Code 120 may be source code, byte or other interpreted code, binary, machine or other executable code, or native code, managed or unmanaged code, or any other code that may be executed on behalf of client 110. Code 120 may be submitted as part of a request to a network-based interface for execution engine 130 (e.g., via an Application Programming Interface (API)).

Execution engine 130 may determine an execution plan for code 120. For example, execution engine 130 may generate an execution graph, such as discussed below with regard to FIG. 4, and may identify the operations, computing resources, and dependencies between operations in order to execute code 120. Execution engine 130 may evaluate the execution plan to determine isolation types for computing resource(s) that may execute different portions of the code according to the execution plan. For example, a cluster of virtual instances implementing a data processing engine may be identified to perform a scanning operation that filters out unwanted data and provides the reduced data set for subsequent analysis operations. An isolation type may be determined for the cluster of virtual instances. A different isolation type may be determined for other computing resources (e.g., other virtual compute instance(s)) which may perform the analysis operations. As discussed below with regard to FIGS. 3 and 5, the risk a portion of code poses (e.g., such as unknown code) may be used to select whether greater or less isolation is to be provided (as different isolation types may provide greater or lesser isolation).

As indicated in FIG. 1, execution engine 130 may cause different computing resource(s) 140 (e.g., servers, switches, computing nodes, storage devices, services, mobile devices, mainframes, or other hardware and/or software components) to execute code portions according to the determined isolation type for the resources 140. For example, in some embodiments, an isolation type may include physically isolated resources 140a. Physically isolated resource(s) 140a may include bare metal servers or instances that are physically configured to execute code (including the execution environment, operating system, supporting drivers or applications, etc.) for a single client. Logically isolated resource(s) 140b may provide less isolation than physically isolated resource(s) 140a, and may include resources 140b that provide isolation through enforcing rules or limitations on the code that can be executed at computing resources (e.g., an operating system virtualization layer or machine virtualization layer that is only allowed to execute code on behalf of a single client). Multi-tenant resource(s) 140c may provide less isolation than physically isolated resources(s) 140a or logically isolated resource(s) 140b and may be implemented using virtualization techniques (e.g., an operating system virtualization layer or machine virtualization layer) but still can or does execute code on behalf of multiple clients at a same host resource.

Please note that the previous description of determining isolation types for executing code portions is a logical illustration and thus is not to be construed as limiting as to the architecture for implementing an execution engine, computing resources, or code submitted for execution.

This specification begins with a general description of an execution service that executes code received at the execution service by dynamically routing execution of the code to computing resources that are configured to provide a type of isolation for executing different portions of the code. Then various examples of the execution service, including different components/modules, or arrangements of components/module that may be employed as part of implementing the execution service are discussed. A number of different methods and techniques to implement determining isolation types for executing code portions are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
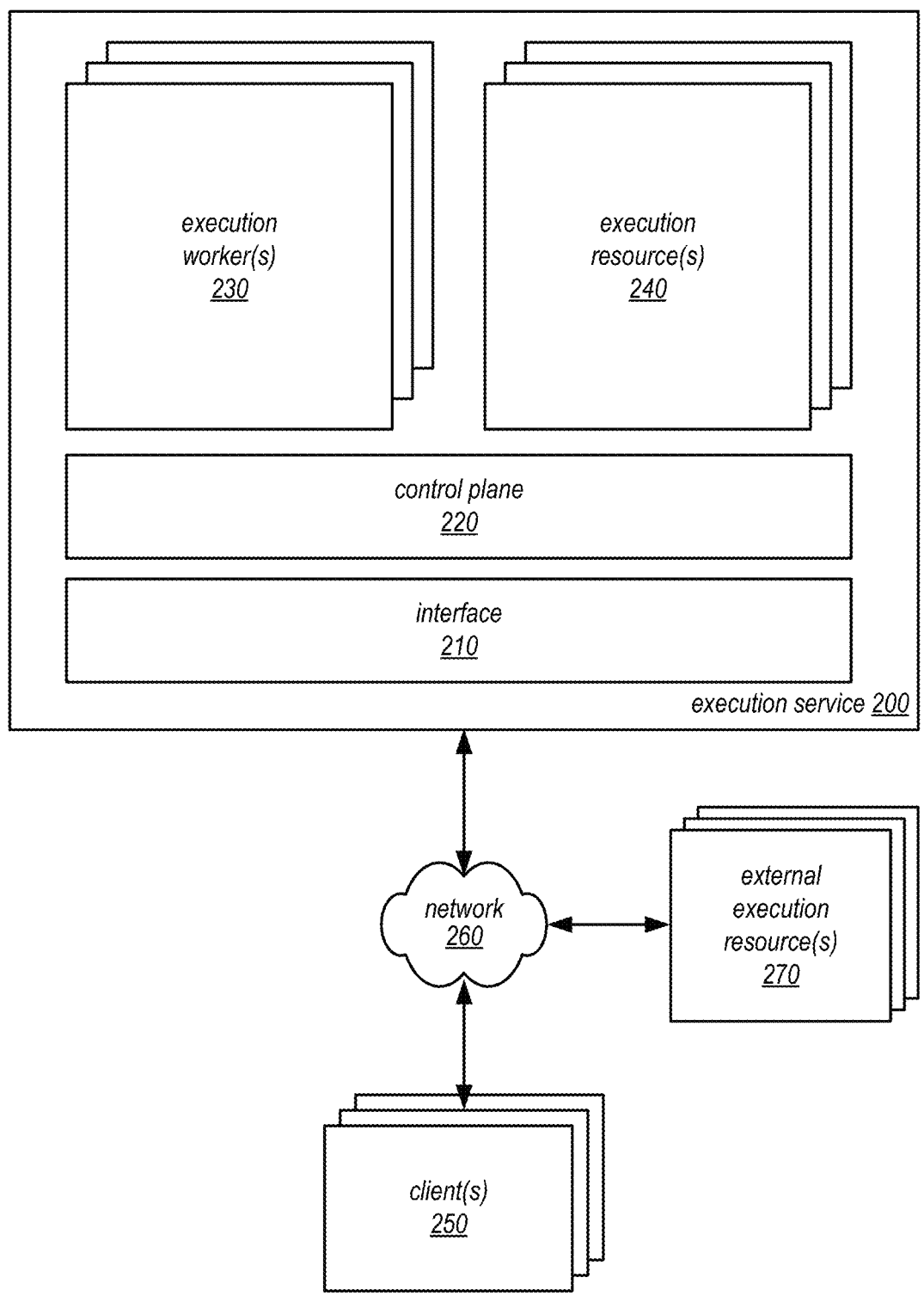
FIG. 2 illustrates a logical block diagram of a network-based execution service, according to some embodiments.

FIG. 2 illustrates a logical block diagram of a network-based execution service, according to some embodiments. Execution service 200 executes code received from clients. Code may be submitted to execution service 200 via a network-based service interface (e.g., at a network endpoint that is not assigned or directed to any particular computing resource for executing code). The execution of code may be treated as a unit of work by execution service 200, a task that is performed until completion and not subject to time limits or other execution restrictions (unless execution of the code is determined to have quit unexpectedly). Execution service 200 may determine isolation types for computing resource(s) executing the code, procure or provision computing resources with the determined isolation types, and direct execution of the code at the computing resources.

In at least some embodiments, execution service 200 may be implemented as part of a provider network. A provider network may be a private or closed system or may be set up by an entity such as a company or a public sector organization to provide one or more services (such as various types of cloud-based storage) accessible via the Internet and/or other networks to clients, such as clients 250. The provider network may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and storage services offered by the provider network. In some embodiments, provider network may implement various computing resources or services, such as a data storage service(s) (e.g., object storage services, block-based storage services, or data warehouse storage services), an ETL service, execution service 200, as well as other service(s), which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated). Various ones of the services offered by the provider network may provide either external execution resource(s) 270 or execution resource(s) 240.

For example, data storage service(s) may implement different types of data stores for storing, accessing, and managing data on behalf of clients as a network-based service that enables clients to operate a data storage system in a cloud or network computing environment. Such services may implement data storage that is accessed, directed, or otherwise used to execute portions of code as directed by execution service 200. Data storage service(s) may include various types of database storage services (both relational and non-relational) or data warehouses for storing, querying, and updating data. Such services may be enterprise-class database systems that are scalable and extensible. Queries may be directed to a database or data warehouse in data storage service(s) that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) may also include various kinds of object or file data stores for putting, updating, and getting data objects or files, which may include data files of unknown file type. Such data storage service(s) may be accessed via programmatic interfaces (e.g., APIs) or graphical user interfaces. Data storage service(s) may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Other service(s) may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services, which may be invoked or directed by execution service 200. Various other distributed processing architectures and techniques may be implemented by data processing services (e.g., grid computing, sharding, distributed hashing, etc.). Note that in some embodiments, data processing operations may be implemented as part of data storage service(s) (e.g., query engines processing requests for specified data).

A provider network may also implement services that are clients of execution service 200. For example, another service that is implemented as part of a provider network may be an Extract, Transform, Load (ETL) service. The ETL service may also perform ETL jobs that extract, transform, and load from one or more of the various data storage service(s) to another location. For example, the ETL service may provide clients with the resources to create, maintain, and orchestrate data loading jobs that take one or more data sets, perform various transformation operations, and store the transformed data for further processing (e.g., by one or more of data processing service(s)). The ETL service may submit these ETL jobs as code to execution service 200 to be performed. The ETL service may access a data catalog generated by ETL service in order to perform an ETL operation (e.g., a job to convert a data object from one file type into one or more other data objects of a different file type). Other types of services or systems that may be clients of execution service 200 may include event handling services, data processing pipelines, or other systems that trigger or request the execution of certain operations, which may be defined by code.

Generally speaking, clients 250 may encompass any type of client configurable to submit network-based requests to execution service via network 260. For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of execution service 200 to perform or execute code to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network. In some embodiments, client 250 may be configured to generate network-based services requests according to a Representational State Transfer (REST)-style network-based services architecture, a document- or message-based network-based services architecture, or another suitable network-based services architecture. In some embodiments, a client 250 may be configured to provide access to execution service 200 to other applications in a manner that is transparent to those applications.

Clients 250 may convey network-based services requests (e.g., operations, tasks, or jobs, to execute code) to and receive responses from execution service 200 via network 260. In various embodiments, network 260 may encompass any suitable combination of networking hardware and protocols necessary to establish network-based-based communications between clients 250 and execution service 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and execution service 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and execution service 200. It is noted that in some embodiments, clients 250 may communicate with execution service 200 using a private network rather than the public Internet.

Execution service 200 may implement an interface 210 which may be a programmatic interface (e.g., API) or graphical user interface (GUI) to allow for code and execution requests to be submitted to execution service 200 via a network (e.g., network 260 in FIG. 2). Execution service 200 may implement control plane 220, which may handle code execution requests to prepare the execution of code included in code execution requests. For example, control plane 220 may implement multiple computing nodes or servers to listen for code execution requests at a service endpoint (e.g., network address). When a request is received at the service endpoint, a compute node or server of control plane 220 may parse the request, check for request validity, repack format, or organize data in the request (e.g., code, execution criteria, identity, etc.) and dispatch the task to execution worker(s) 230. Control plane 220 may also monitor the health of execution worker(s) 230, check for failure events (e.g., code that failed to execute due to execution worker 230 or execution resource 240 failure), retry execution jobs, or manage the resources for performing execution requests, such as adding or removing execution worker(s) 230 or execution resource(s) 240.

In at least some embodiments, execution service 200 may implement a fleet or pool of execution worker(s) 230 which may perform management of the execution of code submitted in a request to execution service 200. For example, execution worker(s) may implement an execution engine, as discussed below with regard to FIG. 3, to determine an execution plan for code, determine isolation types for computing resources executing the code, and direct execution of the code at identified computing resources.

Execution service 200 may implement various computing resources as execution resource(s) 240. As noted above execution service 200 may utilize computing resources of other service(s) in a provider network. For example, execution service may reserve a pool or fleet of computing resources from one or more different services, making the pool or fleet computing resources available for performing code execution tasks. In some embodiments, available computing resource(s) may be preconfigured, to implement operating systems, data processing engines, network configurations, or other capabilities or attributes that may commonly satisfy execution criteria or isolation types for executing code. If, for instance, code is typically submitted using one of a small number of programming languages, then available computing resources may be configured with processing engines or other applications that support the small number of programming languages.

In some embodiments, execution resource(s) 240 may be user account computing resource(s) made available for executing code on behalf of a client associated with the user account. For example, when a request to execute code is received, a user account associated with the client may be identified. A listing of resources that are available or in use may be provided to identify account computing resource(s). In at least some embodiments, external computing resource(s) 270 may be used to execute code by execution service 200. For example, external computing resource(s) 270 may be on premise servers, services, or systems, other provider networks or publicly available computing services. External computing resource(s) 270 may implement an execution registration agent which may provide the identity, location, associated accounts and/or capabilities of external computing resource(s) 270 to execution service 200. Execution service 200 may consider external computing resource(s) 270 when identifying computing resource(s) configured to provide the determined isolation type for executing portions of code.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below. In various embodiments, the functionality of a given system or service component (e.g., a component of execution service 200) may be implemented by a particular node or may be distributed across several nodes. In some embodiments, a given node may implement the functionality of more than one service system component (e.g., more than one data store component).

Figure 3:
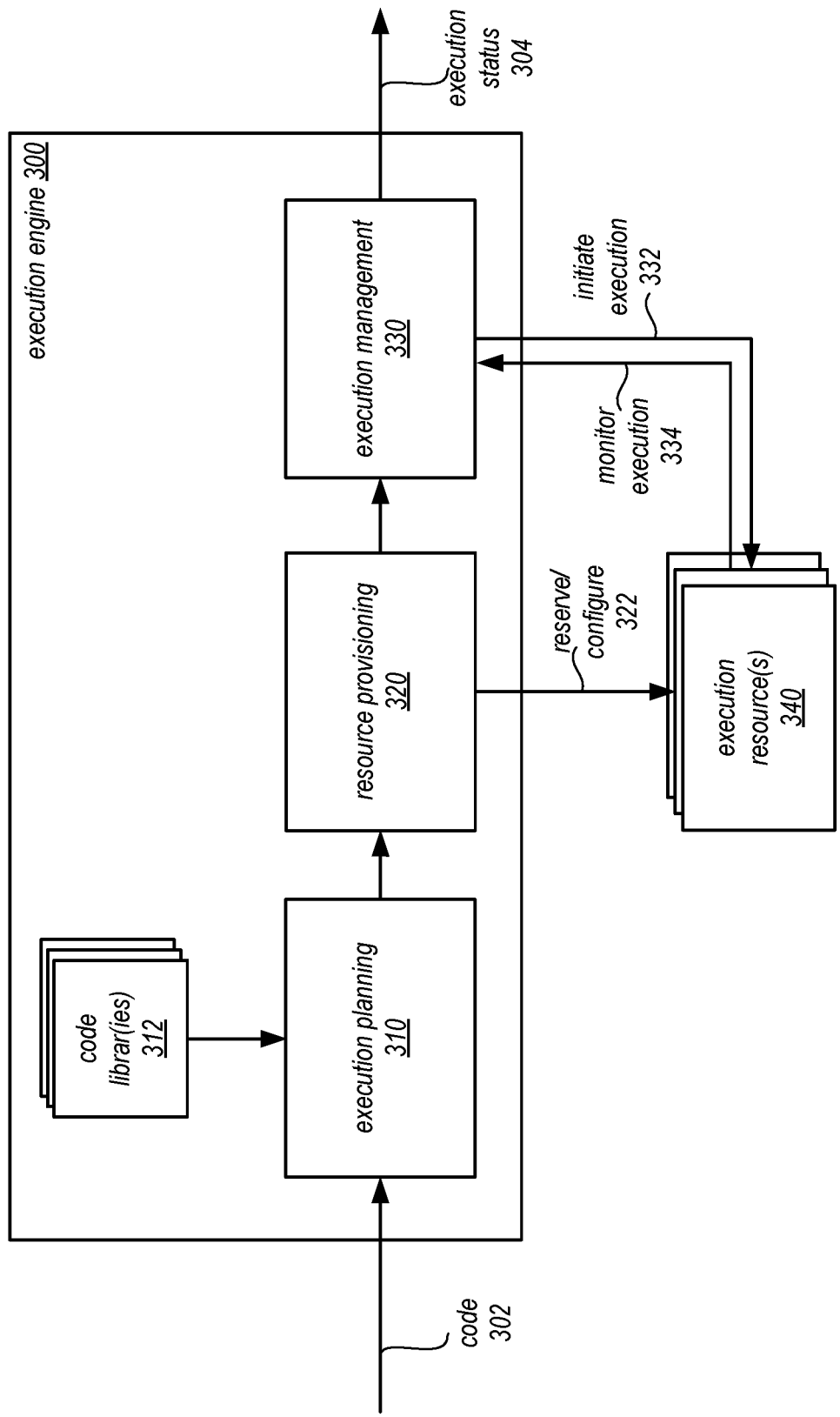
FIG. 3 illustrates an execution engine that implements determining isolation types for executing code portions, according to some embodiments.

FIG. 3 illustrates an execution engine that implements determining isolation types for executing code portions, according to some embodiments. The execution engine may be implemented as part of execution workers 230, in FIG. 2 above, or as part of other code execution systems or services. The code 302 to be executed may be received (e.g., via interface 210 for execution service 200) and provided to execution engine 300. Execution engine 300 may implement execution planning 310, in some embodiments, to determine execution plan and isolation types for computing resources to execute code 302. For example, as discussed below with regard to FIG. 4, execution planning 310 may generate an execution plan that is an execution graph (or other description of operations, dependencies, and or computing resources). The execution graph (or other form of execution plan may then be evaluated to identify the isolation types for the computing resources to execute the different operations. For example, operations that are node based on implementations maintained in code librar(ies) 312 may be used to identify operations for isolation types with multi-tenant execution environments (e.g., able to or executing code on behalf of other clients of execution service 200). Unknown code may be identified for greater isolation, such as isolation types that provide logical or physical isolation. In at least some embodiments, a scoring system, as discussed below with regard to FIG. 6 may be implemented to determine the isolation type for different computing resources to execute code.

Execution engine 300 may implement resource provisioning 320 to obtain computing resources configured with the type of isolation determined at execution planning 310. For example, as discussed above with regard to FIG. 2, a pool of preconfigured, available or otherwise reserved computing resources (e.g., implemented as part of other services like a virtual compute service, software container service, or other computing service) for execution service may be considered. If any of the pool computing resource(s) have the appropriate type of isolation, then the pool computing resource(s) may be identified. Similarly, computing resources associated with a user account (e.g., that submitted the code execution request 302) may be evaluated or external computing resources that have been registered or otherwise identified to execution service 200 as available to execute the code. Computing resource evaluation may be performed by comparing resource capabilities, configurations, specifications, manifests, build files, other metadata with the determined isolation type. If a resource meets the type of isolation, then the computing resource may be identified. For example, different implementations of logical isolation (e.g., via operating system virtualization or machine virtualization may be provided), any one of which may satisfy the type of logical isolation determined for a computing resource.

Resource provisioning 320 may reserve, assign, or otherwise obtain rights 322 to execute the code on identified execution resource(s) 340. In those scenarios where identified resources are resources that have to be configured to provide the isolation type (e.g., dedicated or restricted to running code from a particular client, though the computing resource may be capable of operating in multi-tenant fashion), resource provisioning 320 may submit configuration requests, initiate reboots, re-images, allocate, or otherwise perform operations to configure computing resources in order to provide the isolation type. For example, resource provisioning 320 may perform operations to reserve a bare metal server instance, install the appropriate execution environment for the assigned portion of code, and otherwise ready the server instance as a physically isolated computing resource.

Once the identified resources are provisioned, then execution management 330 may route, direct, or otherwise initiate 332 the execution of the code at the execution computing resources 320. For example, the identified resource(s) 340 may be one or more host(s) (e.g., a computing system, server, node, or devices like computing system 1000 in FIG. 7). The hosts may implement operating system virtualization layer in order to provide virtualized operating system environments for different software containers. Execution management 330 may direct code execution at one or more software container(s), to implement a container cluster for executing a portion of the code according to the execution plan at the determined type of isolation.

Execution management 330 may monitor the performance of execution resource(s) 340 to perform execution management functions, such as failure recovery (if a host or container fails), automatic cluster scaling (e.g., increasing or decreasing software containers procured for an execution task), heat management (e.g., performing, directing, or implementing load balancing amongst resource(s) 340, or any other execution resource management function. Execution management may update execution status 304 in a task state (not illustrated) to include states, such as "running" "paused" "error/failure," or "cancelled." Task status or state may be stored as well as other task errors or events. In some embodiments, task state may be stored in a database or other storage system (e.g., an event log) that may be queryable for particular tasks and data. In at least some embodiments, a metric collection service or store may access task state (or receive push notifications from a task state store) when changes to task status occur. In this way event logs for executing tasks may be maintained separately from execution resource(s) 340 so that event logs are not lost in the event of host or container failure.

Figure 4:
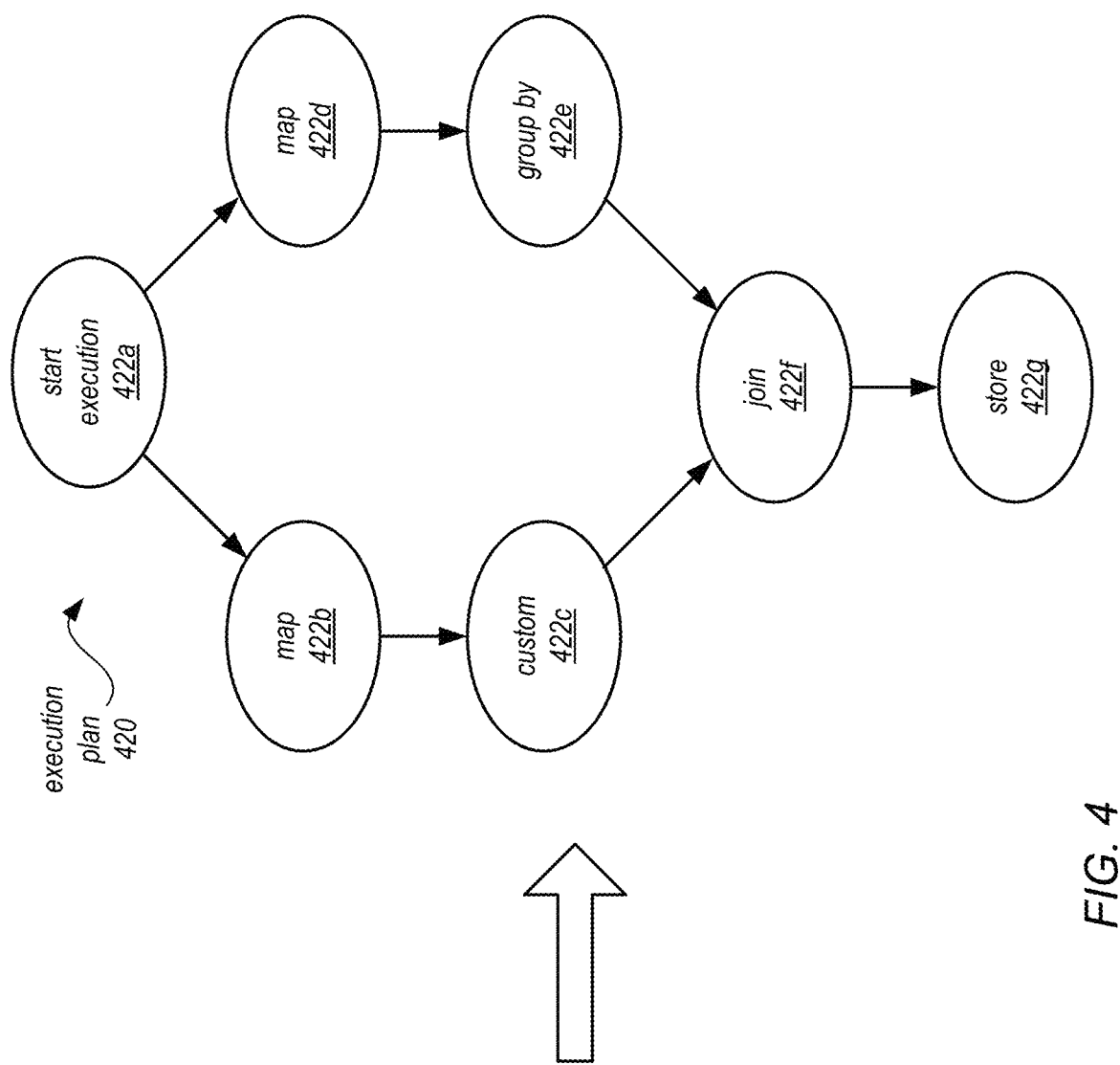
FIG. 4 is a logical block diagram illustrating example execution plan generated for code, according to some embodiments.
Figure 4:
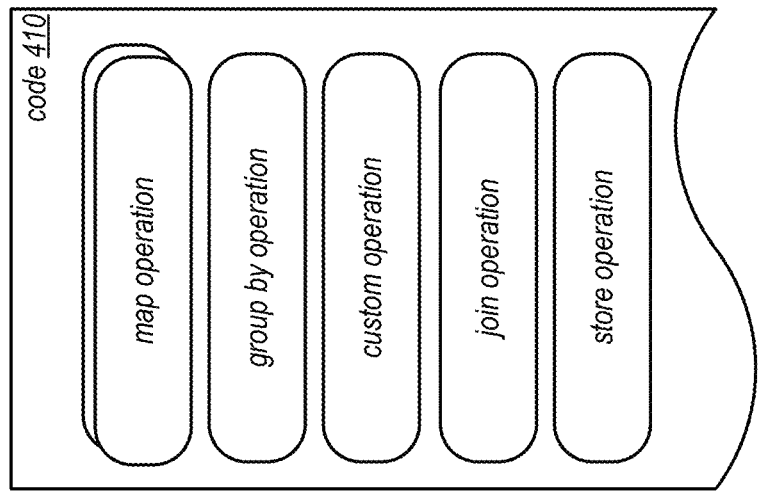

Different types of code may be submitted to perform different tasks, operations, or jobs. For example, in at least some embodiments, the code may perform an Extract, Transform, Load (ETL) job to extract data from a source, move and or transform the extracted data, and load the data into a different location. FIG. 4 is a logical block diagram illustrating example execution plan generated for code, according to some embodiments. The example execution plan may be generated for ETL code.

For instance, code 410 may include various operations such as map operations to retrieve and map data from a source (e.g. a database table, data object or file). Some of the retrieved data may be subjected to different operations. A group by operation (e.g., to group data values according to an association between the data values, such as a common data field value in a record), for example may be applied to data mapped from one data source, while a custom operation (e.g., to apply various statistical analyses, transforms, or other manipulations) may be applied to data mapped from the other data source. Then the resulting data from the group by and customer operations may be joined together in a join operation and stored in a destination data store according to a store operation.

Code parsing, execution planning, or other execution engine component may parse code 410 identify these operations, their dependencies and generate an execution plan, such as execution plan 420 in FIG. 4. Execution plan 420 may include various nodes or portions that identify the operations or corresponding portions of code 410 to execute, as well as the ordering or dependencies of the operations (e.g., input values, parameters, chronology, etc.). In some embodiments, execution plan 420 may identify the number of type of computing resources needed or desired to carry out the execution plan (e.g., X clusters of type A, a node, instance, or server of type B, etc.). Execution plan 420 may then be evaluated to determine the isolation type for portions of code or operations. Start execution 422*a* may identify the resource to direct or ensure completion of the execution and may be evaluated for different isolation types. For example, an evaluation rule may be applied indicating that directing or starting resources (e.g., performing start execution 422*a*) may always be logically isolated.

Figure 6:
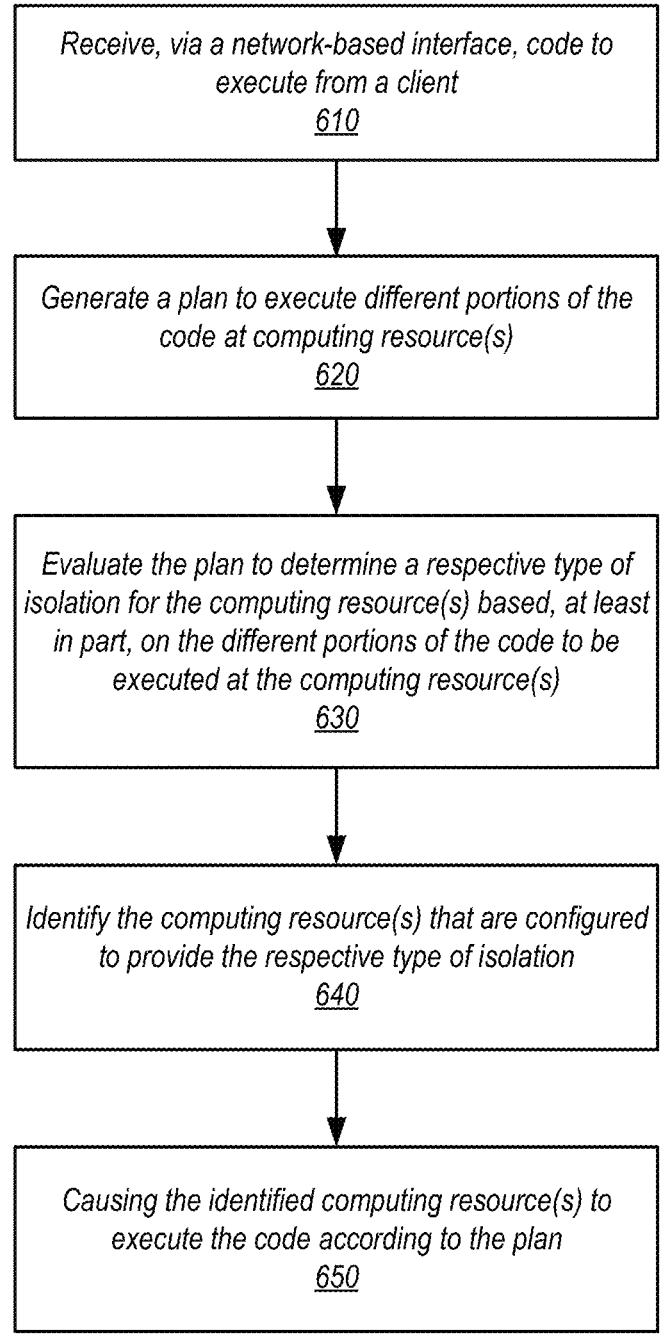
FIG. 6 is a high-level flowchart illustrating methods and techniques to implement determining isolation types for executing code portions, according to some embodiments.

Other operations, such as map operations 422*b* and 422*d* may be evaluated to determine whether they perform predefined or known operations (e.g., according to a library or other specification, as discussed above with regard to FIG. 3. or below with regard to FIG. 6. Map operations may follow specific data reading, comparing, and mapping rules that may prevent access to data or processes that are not specified in the operation. Custom operation 422*c*, may be identified as unknown due to a customized implementation provided as part of the code (or along with the code in a separate library or specification). As unknown code, the custom operation may be assigned to particular type of isolation by a default rule (e.g., physical isolation for unknown code), in some embodiments. In other embodiments, an isolation scoring system, that examines the code for risk or cost factors may be employed (as discussed below) to determine an isolation score used to assign the type of isolation for custom operation 422*c*.

Group by operation 422*e*, join operation 422*f*, and store operation 422*g* may be similarly evaluated. If unknown (or creating unknown results or scope due to an unknown predecessor operation like custom operation 422*c*), then an appropriate isolation type may be determined. Note that multiple different isolation types may be determined for some execution plans (even if the same type of computing resource can perform all of the execution plan, resulting in different computing resources being identified that are respectively configured with the different isolation type), while a single isolation type may be chosen for every operation in other scenarios.

Figure 5:
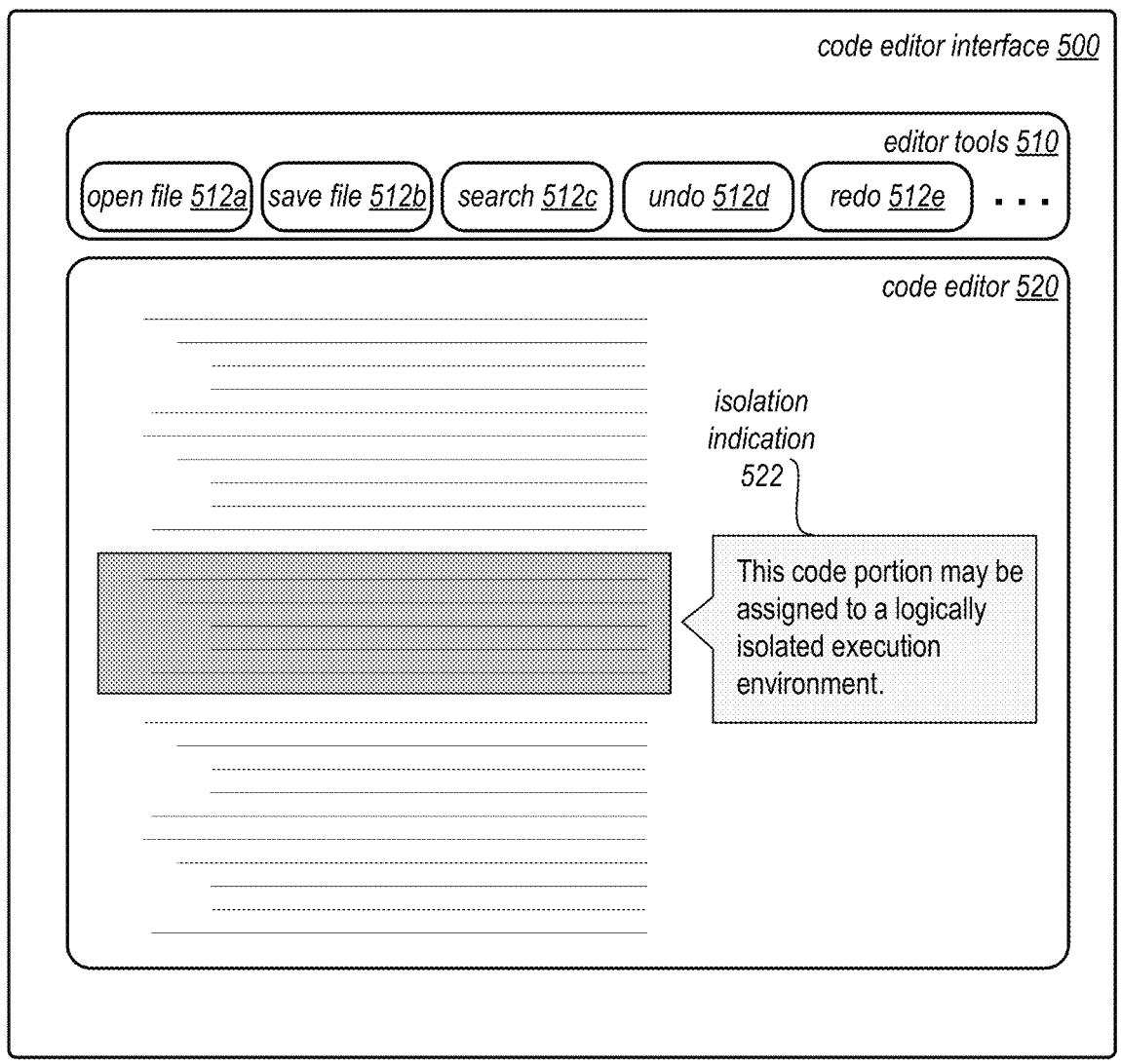
FIG. 5 is an example code editor interface providing indications of isolation type for executing code portions, according to some embodiments.

Isolation type determination for executing code may be performed at runtime, as discussed in the example code execution requests discussed above. However, in some embodiments, isolation type determination may be performed to code that is submitted to or stored in execution service 200, which may be changed by a user. For example, execution service 200 may allow users to edit code prior to execution. An indication or identification of code that is or will be assigned to a resource of a certain type of isolation may be indicated in order to provide users with the opportunity to change the code and thus change the isolation type for executing the code. FIG. 5 is an example code editor interface providing indications of isolation type for executing code portions, according to some embodiments.

Code editor interface 500 may be implemented as part of a hosted (e.g., website) graphical user interface for execution service interface 210. Code editor interface 500 may implement various editing tools 510 to manipulate or edit a code file in code editor 520. For example, editor tools 510 may include various graphical user interface elements to open files 512 (or close them), save files 512b, search the text of files 512c, undo actions or edits 512d, redo actions or edits 512e, or various other editing operations. Code editor 520 may provide a text interface that allows for the text of a code file to be displayed or edited (e.g., using mouse cursors, keyboard, keypad, or other text inputs).

Code editor 520 may dynamically display isolation type indications, such as isolation indication 522 to a user. For example, isolation indication 522 may display explanatory text denoting the isolation type of the highlighted code portion (e.g., logical isolation). In some embodiments, alternative or replacement code may be provided, linked to, or offered as part of a code creation or update wizard or series of user interface windows or elements (e.g., drop-down lists). A user may change the highlighted portion, select save file 512b (or not as code editor 520 may update automatically) to detect whether a change in the code of the highlighted section has resulted in a change of isolation type. The same techniques to determine isolation type, as discussed above with regard to FIG. 3 and below with regard to FIG. 5 may be implemented to dynamically update displayed isolation indications. If code execution payment structures or plans change as a result of different isolation types, such changes may be displayed or communicated as part of isolation indications, in some embodiments.

Although FIGS. 2-5 have been described and illustrated in the context of an execution service, the various techniques and components illustrated and described in FIGS. 2-5 may be easily applied to other execution platforms that have access to computing resources for executing code in different embodiments. As such, FIGS. 2-5 are not intended to be limiting as to other embodiments of a system that may implement determining isolation types for executing code portions. FIG. 6 is a high-level flowchart illustrating methods and techniques to implement determining isolation types for executing code portions, according to some embodiments. Various different systems and devices may implement the various methods and techniques described below, either singly or working together. For example, an execution service such as described above with regard to FIGS. 2-5 may be configured to implement the various methods. Alternatively, a combination of different systems and devices, such as an execution service implemented as part of another system (e.g., an ETL system, am image processing system, etc.) that executes code submitted for execution. Therefore, the above examples and or any other systems or devices referenced as performing the illustrated method, are not intended to be limiting as to other different components, modules, systems, or configurations of systems and devices.

As indicated at 610, code may be received from a client via a network-based interface, in some embodiments. The code may be source code, byte or other interpreted code, binary, machine or other executable code, or native code, managed or unmanaged code, or any other code that may be executed on behalf of a client. In at least some embodiments, the code may be declarative code that includes functions, operations, or requests, some of which may be defined or implemented according to libraries or other specifications of configuration data, documentation, help data, message templates, pre-written code, sub-routines, classes, values, or type definitions. Other functions, operations, or requests may be defined or implemented in the code (or included in libraries or other specifications submitted along with the code).

The code may be received via a network-based interface. The network-based interface may be a programmatic interface, such as an Application Programming Interface (API), that allows a client to request the execution of code provided via the API. For example, an execution job API may include the code as well as other execution criteria, controls, or other information to execute the code. For example, the execution criteria may include performance characteristics or parameters that indicate the length of time for executing the code. In at least some embodiments, the request to execute the code may include or specify an isolation type for one or more resources executing the code (which may override the determination made at element 630). In some embodiments, the request (or a separate request) may enable or disable the determination of isolation types for received code, reverting to or from a default setting (such as executing all code at a particular isolation type).

As indicated at 620, a plan may be generated to execute different portions of the code at one or more computing resources, in some embodiments. For example, the code may be parsed, interpreted, or otherwise processed to generate an execution graph, such as a directed acyclical graph illustrated in FIG. 4 discussed above. In other embodiments, an execution plan may be a set of executable instructions or other interpretation of the code. An execution plan may indicate a number or type of computing resource(s) needed to execute the code. For example, the execution plan may identify data operations for querying, scanning, or evaluating a large amount of data or data files (e.g., one or more database tables) and a corresponding cluster of data processing engines (e.g., Spark, Hadoop MapReduce, database engines, tuple scanners, file readers, etc.) to perform the data operations. The execution plan may identify network connections, security, access, or other permission credentials to execute the code (e.g., with respect to data storage or systems in which input data is received from or output data given to).

As indicated at 630, the plan may be evaluated to determine a respective type of isolation for the computing resource(s) based, at least in part, on the different portions of the code to be executed at the computing resource(s), in some embodiments. For example, different code portions may specify or declare different operations that are included in the plan. These operations may be evaluated with respect to libraries, specifications of configuration data, documentation, help data, message templates, pre-written code, sub-routines, classes, values, or type definitions that are supplied or known by the execution engine, or other components performing the evaluation. If, for example, the code portion includes server query language (SQL) statements, then the actions, scope, or risk of the operations in the code portion can be determined (e.g., executing a SELECT statement with respect to table A will only access table A and compare data within predicates included in the select statement). Based on the actions, scope, or risk of the operation, an isolation type for the operation can be determined. In the SQL statement example, the risk of executing the SELECT statement is small as the actions of the SELECT statement are known and therefore may not perform erroneous, malicious or other damaging actions. An isolation type that allows for a multi-tenant execution environment may thus be determined, as the SELECT statement is not likely to interfere with the data or operations of other code that may execute on a computing resource.

In at least some embodiments, different portions of code (or the corresponding operations or portions of the execution plan) may be evaluated with respect to one or more criteria so that an isolation score is determined. For example, risk evaluations may determine a risk score (or component) based on whether the code can be identified, whether the code accesses certain data, is written in a particular language or form, includes or contains any markers or identifiers in common with malicious or unsafe code, or any other risk determination criteria. In some embodiments, a cost score, factor, or other cost determination for executing a portion of code, operation, or the entire execution plan with different combinations of isolation types. If, for instance, each operation is assigned to be executed in a physically isolated computing resource, except for one operation (which may be executed in a logically isolated or multi-tenant environment), then the cost of procuring the logically isolated or multi-tenant environment may not achieve enough cost savings to just having the additional computing resource with a different type of isolation. Different combinations of analysis or scores may be combined to create a composite isolation score. For example a risk score may be weighted more than cost score when determining an isolation score for a code portion.

Isolation types for computing resources may be assigned according to the isolation scores of the code portions to be executed at the computing resources. For example, different thresholds or ranges of isolation scores may be mapped to different types of isolation. A highest range of isolation scores may be mapped to a physical type of isolation, whereas a lowest range of isolation scores may be mapped to a multi-tenant environment.

The computing resource(s) that are configured to provide the respective type of isolation may be identified, according to some embodiments, as indicated at 640. For example, if a certain type of data processing engine is identified with a multi-tenant type of isolation, then data processing engines may be provisioned, started, initiated, reserved, allocated, or otherwise procured that implement the type of data processing engine and are configured with the type of isolation (e.g., physical, logical, or multi-tenant). In at least some embodiments, computing resource(s) may be obtained from provider network services, such as a same provider network offering execution service 200 in FIG. 2 discussed above. These resources may include the various computers, servers, processors, data storage, networking communications, or any other resources for executing the portions of code assigned to be executed to the computing resources according to the execution plan.

As indicated at 650, once identified, the computing resource(s) may be caused to execute the code according to the plan, in various embodiments. For example, the execution plan, portions of code, operations, directions, or other requests may be sent to the computing resource(s) to cause the computing resources to perform the assigned portions of the code according to the execution plan. If the execution plan describes a data extraction and aggregation operations, a cluster of processing engines (configured with a determined type of isolation) may be sent the original (or generated) code portions or requests to perform the assigned data extraction and aggregation operations, while another resource (e.g., with a different type of isolation) may be sent the original (or generated) code portions or requests to perform an analysis, transformation, or storage operation using the results of the data extraction and aggregation operations.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
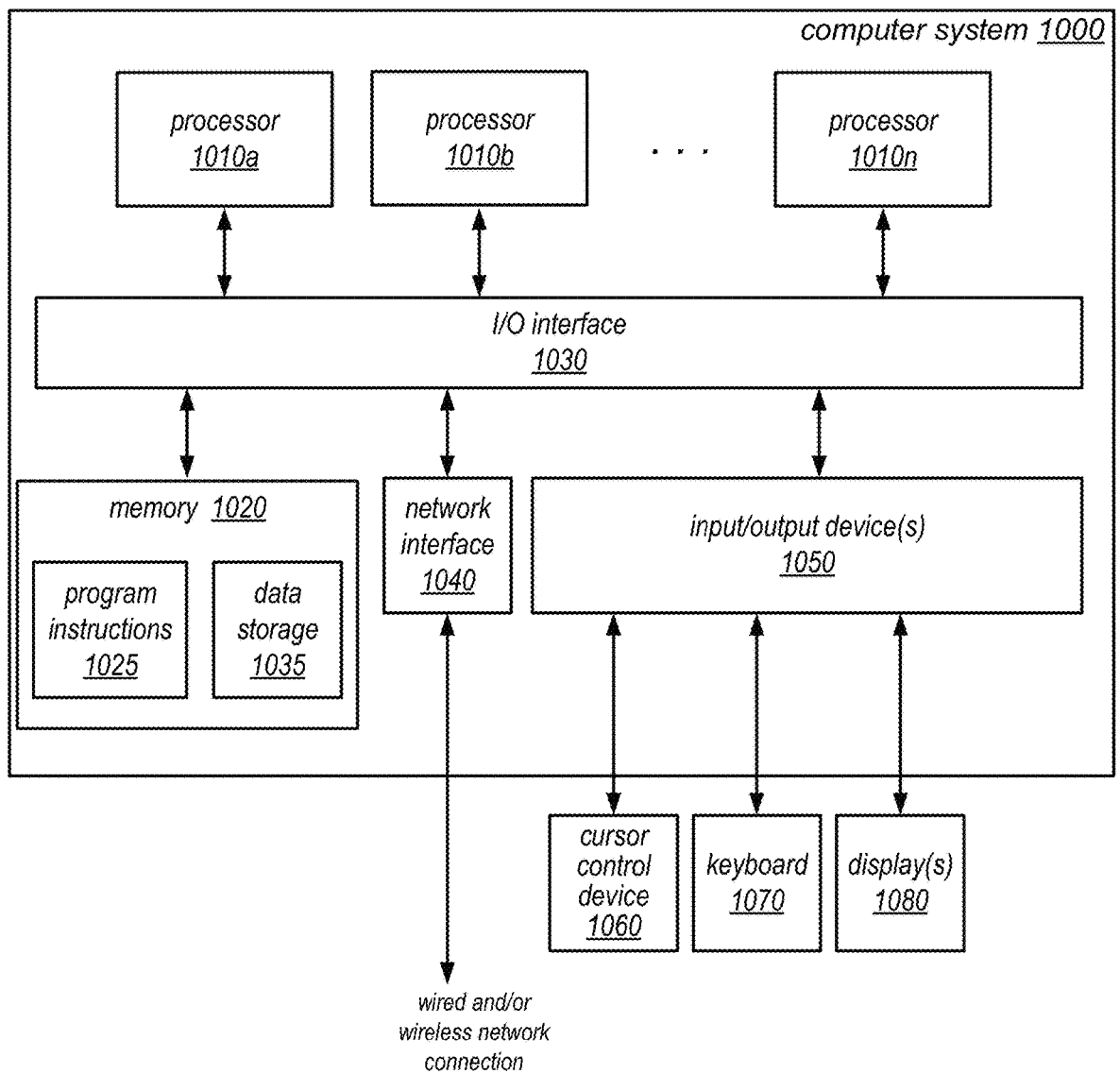
FIG. 7 illustrates an example system configured to implement the various methods, techniques, and systems described herein, according to some embodiments.

Embodiments of determining isolation types for executing code portions as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a execution service may present execution services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a memory to store program instructions that, if executed, cause the at least one processor to implement an execution engine of a provider network, the execution engine configured to:
        receive, from a client at a network endpoint of the provider network via a network-based interface, code to execute from a client;
        after receipt of the code from the client at the network endpoint, generate at the execution engine of the provider network, a plan to execute different portions of the received code at one or more computing resources;
        evaluate the plan by the execution engine of the provider network to determine a respective type of isolation for the different portions of the code at different ones of the computing resources;
        identify, by the execution engine of the provider network, the different ones of the computing resources that are configured to provide the respective type of isolation determined from the evaluation; and
        cause the identified computing resources to execute the code according to the plan.

2. The system of claim 1, wherein the respective isolation type for at least one of the computing resources is a physical isolation type, wherein at least one of the identified computing resources is physically isolated from executing other code on behalf of another client.

3. The system of claim 1, wherein the respective isolation type for at least one of the computing resources allows for a multi-tenant execution environment, wherein at least one of the identified computing resources is a multi-tenant resource executing other code, received via the network interface, on behalf of another client.

4. The system of claim 1, wherein the network-based interface is an interface for a network-based service that executes a plurality of different code, including the code, on behalf of a plurality of different clients, including the client, wherein the network-based service is implemented as part of a provider network that offers a plurality of different network-based services, including the network-based service, and wherein the identified computing resources comprise at least one of:
    a computing resource offered by the network-based service;
    a computing resource offered by another one of the network-based services of the provider network; or
    a computing resource external to the provider network.

5. A method, comprising:
    receiving, from a client at a network endpoint of a provider network via a network-based interface, code to execute from a client;
    after receiving the code from the client at the network endpoint, generating, by an execution engine of the provider network, a plan to execute different portions of the code at one or more computing resources;
    evaluating, by the execution engine of the provider network, the plan to determine a respective type of isolation for the different portions of the code at different ones of the computing resources;
    identifying, by the execution engine of the provider network, the different ones of the computing resources that are configured to provide the respective type of isolation determined from the evaluation; and causing, by the execution engine of the provider network, the identified computing resources to execute the code according to the plan.

6. The method of claim 5, wherein the respective isolation type for at least one of the computing resources is a physical isolation type, wherein at least one of the identified computing resources is physically isolated from executing other code on behalf of another client.

7. The method of claim 5, wherein the respective isolation type for at least one of the computing resources allows for a multi-tenant execution environment, wherein at least one of the identified computing resources is a multi-tenant resource executing other code, received via the network interface, on behalf of another client.

8. The method of claim 5, wherein evaluating the plan to determine the respective type of isolation for the computing resources comprises:
   determining a respective isolation score for at least one of the portions of the code; and
   assigning the respective isolation type to the computing resource executing the at least one portion of the code according to the respective isolation score.

9. The method of claim 8, wherein determining the respective isolation score comprises determining a cost for executing the one or more portions at different isolation types.

10. The method of claim 5, further comprising providing an indication of the determined isolation type for at least one of the portions of the code to the client.

11. The method of claim 10, further comprising:
   receiving a request to replace the at least one portion of the code with different code, wherein a different isolation type is determined for the one or more computing resources to execute the different code; and
   replacing the at least one portion of the code with the different code, wherein the identifying the one or more computing resources and the causing the execution are performed using the different code and the different isolation type.

12. The method of claim 5, further comprising:
   receiving other code via the network-based interface to execute from another client, wherein a specified isolation type is received along with the other code;
   identifying one or more other computing resources that provide the specified isolation type; and
   causing the other computing resources to execute the other code.

13. The method of claim 5, wherein the network-based interface is an interface for a network-based service that executes a plurality of different code, including the code, on behalf of a plurality of different clients, including the client, wherein the network-based service is implemented as part of a provider network that offers a plurality of different network-based services, including the network-based service, and wherein the identified computing resources comprise at least one of:
   a computing resource offered by the network-based service;
   a computing resource offered by another one of the network-based services of the provider network; or
   a computing resource external to the provider network.

14. A non-transitory, computer-readable storage medium, storing program instructions that when executed by one or more computing devices cause the one or more computing devices to implement:

receiving, from a client at a network endpoint of a provider network via a network-based interface, code to execute from a client;
after receiving the code from the client at the network endpoint, generating, by an execution engine of the provider network, a plan to execute different portions of the code at one or more computing resources;
evaluating, by the execution engine of the provider network, the plan to determine a respective type of isolation for the different portions of the code at different ones of the computing resources;
identifying, by the execution engine of the provider network, the different ones of the computing resources that are configured to provide the respective type of isolation determined from the evaluation; and
causing, by the execution engine of the provider network, the identified computing resources to execute the code according to the plan.

15. The non-transitory, computer-readable storage medium of claim 14, wherein the respective isolation type for at least one of the computing resources is a logical isolation type, wherein the identified computing resources are logically isolated from executing other code received from another client.

16. The non-transitory, computer-readable storage medium of claim 14, wherein the respective isolation type for at least one of the computing resources allows for a multi-tenant execution environment, wherein at least one of the identified computing resources is a multi-tenant resource executing other code, received via the network interface, on behalf of another client.

17. The non-transitory, computer-readable storage medium of claim 14, wherein, in evaluating the plan to determine the respective type of isolation for the computing resources, the program instructions cause the one or more computing devices to implement:
   determining a respective isolation score for at least one of the portions of the code; and
   assigning the respective isolation type to the computing resource executing the at least one portion of the code according to the respective isolation score.

18. The non-transitory, computer-readable storage medium of claim 14, wherein the program instructions cause the one or more computing devices to further implement receiving, via the network-based interface, a request from the client to enable the determination of the respective isolation type to execute the code.

19. The non-transitory, computer-readable storage medium of claim 14, wherein the respective isolation type determined for one of the computing resources executing one of the portions of the code is different than the respective isolation type determined for at least one other of the computing resources executing at least one other of the portions of the code.

20. The non-transitory, computer-readable storage medium of claim 14, wherein the network-based interface is an interface for a network-based service that executes a plurality of different code, including the code, on behalf of a plurality of different clients, including the client, wherein the network-based service is implemented as part of a provider network that offers a plurality of different network-based services, including the network-based service, and wherein the identified computing resources comprise at least one of:

a computing resource offered by the network-based service;
a computing resource offered by another one of the network-based services of the provider network; or
a computing resource external to the provider network.

* * * * *